United States Patent Office 3,004,976
Patented Oct. 17, 1961

3,004,976
AROMATIC CARBOXYLIC ACID ESTERS OF 4-PHENYL-N-ALKANOL-PIPERIDINES
Adrian Marxer, Basel, Switzerland, assignor to Ciba Pharmaceutical Products Inc., Summit, N.J.
No Drawing. Filed July 16, 1958, Ser. No. 748,819
Claims priority, application Switzerland Aug. 19, 1957
10 Claims. (Cl. 260—294)

This invention provides new aromatic carboxylic acid esters of the formula

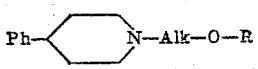

and their salts, in which formula Ph indicates a phenyl radical, R the acyl radical of an aromatic, preferably at most bicyclic, carboxylic acid and Alk stands for a low alkylene radical separating the piperidine nitrogen atom from the ester oxygen atom by 2–4 carbon atoms.

The invention also provides a process for the manufacture of these esters.

In the new compounds the aromatic radicals can be substituted or unsubstituted. Examples of substituents are free or substituted hydroxyl groups, such as low alkoxy groups, for example methoxy, ethoxy or methylene-dioxy, low alkyl radicals, for example methyl or ethyl, free or substituted amino groups and halogen atoms, for example chlorine or bromine. Examples of aromatic carboxylic acid radicals are naphthalene carboxylic acid and cinnamic acid radicals, but preferably the radical of a benzoic acid, especially an alkoxy benzoic acid such as a mono-, di- or trimethoxy-benzoic acid.

The new compounds possess valuable pharmacological properties. In particular they have an anti-fibrillatory action upon the heart. They can accordingly be used as medicaments.

Especially valuable are compounds of the formula

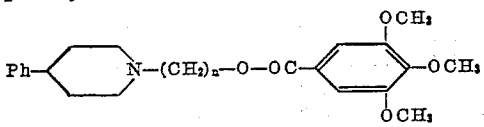

and their salts, in which formula Ph has the above significance but indicates primarily a methoxyphenyl or halogen phenyl such as the chlorophenyl radical and $n$ is a whole number from 2–4 but especially 4. Among these compounds particular mention should be made of the 3:4:5-trimethoxy benzoic acid ester of 4-(4'-p-methoxyphenyl-piperidino)-butanol and its salts.

The new compounds are prepared by methods of known type. Advantageously an alcohol of the formula

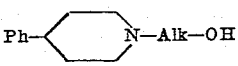

is esterified with an aromatic carboxylic acid. In this case both the alcohol and the carboxylic acid can be used in the form, suitable for esterification, of their reactive functional hydroxyl or acid derivatives. Thus the alcohol, if desired in the form of a metal alcoholate, such as an alkali or alkaline earth alcoholate, can be esterified, for example, with a halide, such as the chloride or bromide, or an ester of the aromatic carboxylic acid with an easily volatile alcohol, for example a low alkanol, or the anhydride of the acid, or a reactive ester of the alcohol, for example with a strong inorganic or organic acid, such as a hydrohalic acid, sulfuric acid or an aromatic sulfonic acid, is reacted with the acid, preferably in the form of a salt, such as an alkali or alkaline earth metal salt. In this case the alcohol can, if desired, also be used in the form of a salt with an acid.

The reactions are carried out in the manner known per se, in the presence or absence of diluents and/or condensing agents, if desired at elevated temperature, in an open vessel or in a closed vessel under pressure. The starting materials are known or can be prepared by methods of known type.

According to the method of working the new compounds are obtained in the form of the free bases or their salts. From the salts the free bases can be prepared by methods of known type. Conversely from the bases by treatment with acids suitable for the formation of therapeutically applicable salts, salts can be obtained, for example those of the hydrohalic acids, sulfuric acid, nitric acid, phosphoric acid, thiocyanic acid, acetic acid, propionic acid, oxalic acid, malonic acid, succinic acid, malic acid, tart/aric acid, methane sulfonic acid, ethane sulfonic acid, hydroxyethane sulfonic acid, benzene or toluene sulfonic acid, salicylic acid or similar acids.

The new compounds can be used in the form of pharmaceutical preparations containing them in admixture with pharmaceutical carrier materials. As carrier materials are concerned, for example, such substances as do not react with the new compounds, for example water, gelatine, lactose, starch, magnesium stearate, talc, vegetable oils, benzyl alcohols, gums, polyalkylene glycols, cholesterol or other known medicament carriers. The pharmaceutical preparations can be, for example, in the form of tablets, dragees, powders or suppositories or in liquid form as solutions, suspensions or emulsions. If desired they are sterilised and/or contain auxiliary substances, such as preserving, stabilising, wetting or emulsifying agents. They can also contain other therapeutically valuable substances.

The invention is illustrated but in no way limited by the following examples:

*Example 1*

23.34 grams of 4-(4'-phenyl-piperidino)-butanol are dissolved in 200 cc. of absolute dioxane and treated dropwise with a solution of 25.36 grams of 3:4:5-trimethoxy-benzoyl chloride in 100 cc. of dioxane. During the dropwise addition the temperature rises by about 10° C. The whole is subsequently heated for 7 hours on an oil bath at 80–85° C. Filtration is carried out from a little separated material and the dioxane solution is concentrated to about 100 cc. under vacuum and treated with 250 cc. of ethyl acetate. The hydrochloride of the 3:4:5-trimethoxy-benzoic acid esters of 4-(4'-phenyl-piperidino)-butanol of the formula

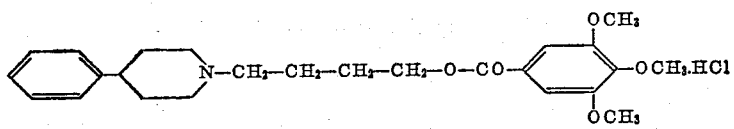

is thereby deposited in crystals; it is isolated, dissolved in 110 cc. of acetone and reprecipitated in crystals with 200 cc. of ethyl acetate; M.P. 147–149° C.

The free ester base is separated from the aqueous solution of the hydrochloride with sodium bicarbonate solution; M.P. 89° C.

The 4-(4'-phenyl-piperidino)-butanol used as starting material is prepared in the following manner:

43.4 grams of 4-phenyl-piperidine are dissolved in a mixture of 100 cc. of absolute ether and 100 cc. of absolute dioxane and the solution produced is added dropwise to a solution of 27 grams of succinic acid anhydride in 150 cc. of ether. Stirring is carried out for 16 hours with heating under reflux (exterior temperature 50° C.). The white crystallisate is filtered with suction and recrystallized from absolute ethanol. Succinic acid-mono-(4-phenylpiperidide) of M.P. 137–142° C. is thus obtained.

9.5 grams of lithium-aluminium hydride are suspended in 300 cc. of absolute ether. To this suspension are added dropwise 26.13 grams of the above described succinic acid-mono-(4-phenyl-piperidide) in 175 cc. of dioxane and the mixture is boiled for 15 hours under reflux. After destruction of the aluminum-complex with caustic soda solution and after evaporation of the ether phase, 4-(4'-phenyl-piperidino)-butanol is obtained in the form of an oil of B.P. 149° C. under 0.02 mm. pressure, which solidifies into crystals of M.P. 44° C.

Example 2

To a solution of 26.34 grams of 4-(4'-p-methoxy-phenyl-piperidino)-butanol in 200 cc. of absolute dioxane is slowly added dropwise without cooling a solution of 25.36 grams of 3:4:5-trimethoxy-benzoyl chloride in 120 cc. of dioxane and the resulting solution is heated for 7 hours on an oil bath at 80–85° C. The solvent is evaporated under vacuum, and the residue caused to crystallize with 200 cc. of ethyl acetate. The resulting hydrochloride of the 3:4:5-trimethoxy-benzoic acid ester of 4-(4'-p-methoxy-phenyl-piperidino)-butanol of the formula

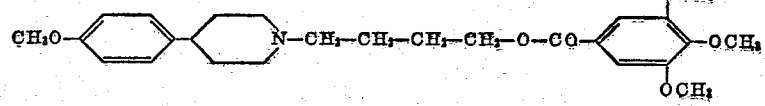

can, for purification, be dissolved in a little ethanol and separated in crystals with much acetone. It melts at 128° C.

The 4-(4'-p-methoxyphenyl-piperidino)-butanol used as starting material can be obtained as follows:

51.43 grams of 4-(p-methoxyphenyl)-piperidine prepared from β-(p-methoxyphenyl)-glutaric acid anhydride and ammonia gas in a melt at 175–180° C. followed by reduction of the resulting β-(p-methoxyphenyl)-glutarimide with lithium-aluminum hydride) are condensed, as described in Example 1, with 27 grams of succinic acid anhydride in dioxane and the product worked up. The resulting succinic acid-mono-(4-p-methoxyphenyl)-piperidide melts at 124–127° C. 56.45 grams thereof are reduced as described in Example 1 with 19 grams of lithium-aluminum hydride to the 4-(4'-p-methoxyphenyl-piperidino)-butanol of B.P. 162° C. under 0.04 mm. pressure and M.P. 60° C.

Example 3

21.69 grams of 2-(4'-m:p-dichlorophenyl-piperidino)-ethanol are dissolved in 200 cc. of absolute dioxane and treated dropwise with a solution of 20.3 grams of 3:4:5-trimethoxy-benzoyl chloride in 100 cc. of dioxane. The temperature thereby rises to 40° C. Stirring is then continued for 5 hours at 80–85° C.

The dioxane solution is evaporated to dryness under vacuum and the residue dissolved in 200 cc. of ethyl acetate. By careful addition of ether (up to 100 cc.) and continuous rubbing with a glass rod, a crystalline precipitate is obtained which is isolated. There is thus obtained the hydrochloride of the 3:4:5-trimethoxy-benzoic acid ester of 2-(4'-m:p-dichlorophenyl-piperidino)-ethanol of the formula

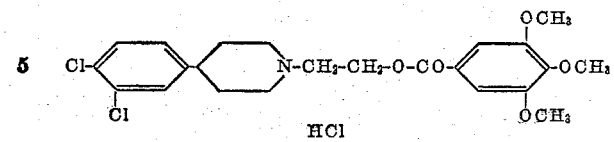

It can be recrystallized from acetone with addition of ethyl acetate and melts at 139–141° C.

The 2-(4'-m:p-dichlorophenyl-piperidino)ethanol is prepared as follows:

103.6 grams of β-(3:4-dichlorophenyl)-glutaric acid anhydride dissolved in 400 cc. of glacial acetic acid, are treated with 61 grams of monoethanolamine in 150 cc. of glacial acetic acid and the whole heated overnight in an oil bath at 140° C. The acetic acid is evaporated under vacuum, the residue dissolved in ether and the ether solution washed with water and dilute ammonia. This causes the crystallization from the ether of a substance of M.P. 113–115° C., which is isolated. A further quantity is obtained from the ether residue. The combined crystallizates are recrystallized from ethanol. In this manner N-(β-acetoxyethyl)-β-(3:4-dichlorophenyl)-glutarimide is obtained.

34.4 grams of this compound are added in portions during about 1 hour to 11.4 grams of lithium-aluminum hydride in 275 cc. of absolute ether and 100 cc. of dioxane and the suspension produced is heated for 12 hours under reflux. By working up as in Example 1 there is obtained the 2-(4'-m:p-dichlorophenyl-piperidino)-ethanol of B.P. 163–166° C. under 0.04 mm. pressure.

Example 4

16.46 grams of 2-(4'-m,p-dichlorophenyl-piperidino)-ethyl chloride hydrochloride are agitated with a potassium carbonate solution and ether, and the ethereal solution which contains the free base of 2-(4'-m,p-dichlorophenyl-piperidino)-ethyl chloride freed completely from ether. The residue is taken up in 150 cc. of ethyl acetate and refluxed while stirring for 15 hours with 12.60 grams of the potassium salt of 3,4,5-trimethoxybenzoic acid and 100 mg. of potassium iodide. The ethyl acetate solution is filtered and rendered weakly acid with alcoholic hydrochloric acid (2.5–N). It is concentrated to a small volume, taken up again in 150 cc. of ethyl acetate and a small amount of ether, and on trituration there is obtained the hydrochloride of 3,4,5-trimethoxybenzoic acid ester of 2-(4'-m,p-dichlorophenyl-piperidino)-ethanol described in Example 3. It melts at 139–141° C.

The 2-(4'-m,p-dichlorophenyl-piperidino)-ethyl chloride hydrochloride used as starting material is obtained as follows:

21.4 grams of 2-(4'-m,p-dichlorophenyl-piperidino)-ethanol are dissolved, while cooling, in 60 cc. of absolute benzene and 60 cc. of thionyl chloride and then refluxed for 2 hours in an oil bath at 95° C. The 2-(4'-m,p-dichlorophenyl - piperidino) - ethyl chloride-hydrochloride which separates in crystalline form is filtered off with suction and washed with ethyl acetate. It melts at 266–269° C.

What is claimed is:

1. The 3,4,5-trimethoxy-benzoic acid ester of 4-(4'-p-methoxyphenyl-piperidino)-butanol.
2. The 3,4,5-trimethoxy-benzoic acid ester of 2-(4'-m,p-dichlorophenyl-piperidino)-ethanol.

3. The 3,4,5-trimethoxy-benzoic acid ester of 4-(4'-phenyl-piperidino)-butanol.
4. Succinic acid-mono-4-p-methoxyphenyl-piperidide.
5. Compounds of the formula:

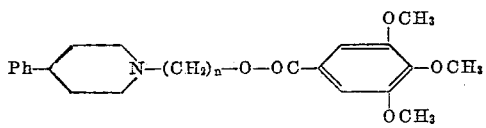

in which Ph stands for phenyl, and *n* is a whole number from 2 to 4.

6. Compounds of the formula:

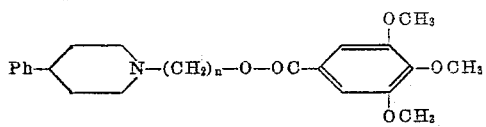

in which Ph stands for lower alkoxy-phenyl and *n* is a whole number from 2 to 4.

7. Compounds of the formula:

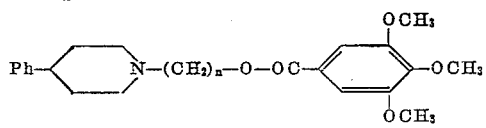

in which Ph stands for methylenedioxy-phenyl, and *n* is a whole number from 2 to 4.

8. Compounds of the formula:

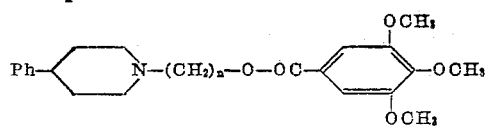

in which Ph stands for halogeno-phenyl, and *n* is a whole number from 2 to 4.

9. A member selected from the group consisting of a compound of the formula:

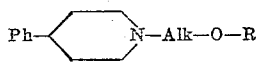

in which Ph represents a member selected from the group consisting of phenyl, hydroxy-phenyl, lower alkoxy-phenyl, methylenedioxy-phenyl, lower alkyl-phenyl and halogeno-phenyl, R stands for a member selected from the group consisting of naphthoyl, benzoyl, hydroxy-benzoyl, lower alkoxy-benzoyl, methylenedioxy-benzoyl, lower alkyl-benzoyl, aminobenzoyl, halogeno-benzoyl and cinnamoyl, and Alk stands for lower alkylene of from 2 to 4 carbon atoms and separating the piperidyl nitrogen atom from the ester oxygen atom by 2 to 4 carbon atoms, and therapeutically acceptable acid addition salts thereof.

10. A compound of the formula:

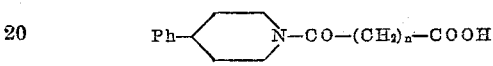

in which Ph represents a member selected from the group consisting of phenyl, hydroxy-phenyl, lower alkoxy-phenyl, methylenedioxy-phenyl, lower alkyl-phenyl and halogeno-phenyl, and *n* stands for an integer from 0 to 2, both inclusive.

References Cited in the file of this patent

UNITED STATES PATENTS

| | | |
|---|---|---|
| 2,765,314 | Schmidle et al. | Oct. 2, 1956 |
| 2,784,192 | Schmidle et al. | Mar. 5, 1957 |
| 2,846,437 | Elpern | Aug. 5, 1958 |
| 2,880,211 | Elpern | Mar. 31, 1959 |
| 2,891,066 | Parcell | June 16, 1959 |
| 2,907,764 | Voegtli et al. | Oct. 6, 1959 |